United States Patent
Stoll et al.

(10) Patent No.: US 12,174,213 B2
(45) Date of Patent: Dec. 24, 2024

(54) METHOD FOR COMPUTED TOMOGRAPHY EXAMINATION OF FRAGMENTS IN GEL BLOCK

(71) Applicant: The United States of America, as represented by the Secretary of the Navy, Crane, IN (US)

(72) Inventors: Kyle D. Stoll, Montgomery, IN (US); Eric Scheid, Bloomington, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 309 days.

(21) Appl. No.: 17/709,952

(22) Filed: Mar. 31, 2022

(65) Prior Publication Data

US 2022/0317009 A1    Oct. 6, 2022

Related U.S. Application Data

(60) Provisional application No. 63/168,531, filed on Mar. 31, 2021.

(51) Int. Cl.
| | |
|---|---|
| *G01N 9/36* | (2006.01) |
| *F42B 35/00* | (2006.01) |
| *G01N 23/046* | (2018.01) |
| *G01N 23/18* | (2018.01) |
| *G06T 5/70* | (2024.01) |
| *G06T 7/00* | (2017.01) |
| *G06T 7/62* | (2017.01) |

(52) U.S. Cl.
CPC ............... *G01N 9/36* (2013.01); *F42B 35/00* (2013.01); *G01N 23/046* (2013.01); *G01N 23/18* (2013.01); *G06T 5/70* (2024.01); *G06T 7/0002* (2013.01); *G06T 7/62* (2017.01); *G01N 2223/401* (2013.01); *G06T 2207/10081* (2013.01)

(58) Field of Classification Search
CPC ........ G01N 9/36; G01N 23/046; G01N 23/18; G01N 2223/401; G06T 7/62; G06T 5/70; G06T 7/0002; G06T 2207/10081; F42B 35/00
See application file for complete search history.

(56) References Cited

FOREIGN PATENT DOCUMENTS

| DE | 102014009151 A | * | 6/2014 | ........... G01N 23/083 |
| DE | 102014009151 A1 | * | 12/2014 | .............. F42B 35/00 |
| DE | 102017000486 A1 | * | 7/2017 | .............. F42B 35/00 |

\* cited by examiner

*Primary Examiner* — Dani Fox
*Assistant Examiner* — Fani Polyzos Boosalis
(74) *Attorney, Agent, or Firm* — Naval Surface Warfare Center, Crane Division; Christopher Feigenbutz

(57) ABSTRACT

Provided is a new and improved method for examining the penetration of fragments in ballistic gelatin through the use of state-of-the art computed tomography (CT) equipment and analytical software. The inventive method can be used for fragment penetration testing as a key performance parameter (KPP). Ballistic gel containing multiple fragments are obtained, placed in a container, positioned in a CT chamber, and scanned. The scan is imported into a Volume graphics software program. A surface determination is made, which is used by one or more algorithms to isolate potential fragmentation within the gel block. The number of fragments, depth of penetration, and fragment mass are then calculated.

7 Claims, 4 Drawing Sheets

METHOD FOR COMPUTED TOMOGRAPHY EXAMINATION OF FRAGMENTS IN GEL BLOCK

CROSS-REFERENCE TO RELATED APPLICATIONS

The present application claims priority to U.S. Provisional Patent Application Ser. No. 63/168,531, filed Mar. 31, 2021, entitled "METHOD FOR COMPUTED TOMOGRAPHY EXAMINATION OF FRAGMENTS IN GEL BLOCK," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 210057US02) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The field of invention relates generally to computed tomography examination. More particularly, it pertains to a method to examine the penetration of fragments in ballistic gelatin through the use of state-of-the art computed tomography (CT) equipment and analytical software.

BACKGROUND

The use of ballistic gelatin (gel) to assess fragmentation effects is standard practice. A fragment or projectile strikes and penetrates a mass of ballistic gel. The depth of penetration is witnessed through the translucent gel and simply measured with a ruler and perhaps photographed. This is very straightforward for a single or small number of objects and observations occurring in a clean environment, such as a small arms test range.

Fragment mass is determined by removing the fragment from the gel and weighing it. However, the use of synthetic ballistic gel to assess dozens to hundreds of fragments generated by explosive munitions quickly becomes an act easier requested than executed. The blocks become covered in debris and the data is often reduced to highlights or gathered with after many hours of careful sectioning to document fragment location and retrieval to examine mass and shape. Alternately, the data is simply lost if the organization cannot afford the cost and time required.

An alternate way of detecting fragments in ballistic gel is with (CT) equipment, which can provide static images of fragment clouds with fiducial reference. However, any quantitative analyses of fragment number and penetration still require manual examination of the digital records. With this method, analyses of mass requires recovery and examination of each fragment. Currently, the practical, quantitative assessment of large numbers of fragments does not exist.

SUMMARY OF THE INVENTION

The present invention overcomes the problems associated with quantitative assessment of large numbers of fragments in ballistic gel with a new and improved method for examining the penetration of fragments through the use of state-of-the art computed tomography (CT) equipment and analytical software. The inventive method can be used for fragment penetration testing as a key performance parameter (KPP). Ballistic gel containing multiple fragments are obtained, placed in a container, positioned in a CT chamber, and scanned. The scan is imported into a volume graphics software program. A surface determination is made, which is used by one or more algorithms to isolate potential fragmentation within the gel block. The number of fragments, depth of penetration, and fragment mass are then calculated.

According to an illustrative embodiment of the present disclosure, it is an object of the invention to provide a method for examining the penetration of fragments in ballistic gelatin through the use of state-of-the art computed tomography (CT) equipment and analytical software.

According to a further illustrative embodiment of the present disclosure, it is an object of the invention to use one or more algorithms to determine the number of fragments, depth of penetration, and fragment mass of particles within the gel block.

According to a yet another illustrative embodiment of the present disclosure, it is an object of the invention to utilize software to digitally erase debris within the gel block.

According to a still another illustrative embodiment of the present disclosure, it is an object of the invention to eliminate the need to account for gel blocks in variable and various conditions, thereby eliminating the need for keeping the gel block beyond the time required for scanning.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Generally, the method of examining ballistic gelatin comprises: obtaining a ballistic gelatin block suspected of containing one or more fragments; placing said ballistic gelatin block in a container; performing a high contrast computer tomography scan of said ballistic gelatin block; utilizing volume graphics software to make a surface determination to outline the surface of said ballistic gelatin block; manually manipulating a region of interest to remove surface noise and contaminates; creating an imaging plane of said ballistic gelatin block where said one or more fragments would have entered; performing an inclusion analysis to isolate said one or more fragments within said ballistic gelatin block; executing an algorithm to highlight major changes in contrast to identify said one or more fragments within said ballistic gelatin block; performing a depth of penetration measurement of each of said one or more fragments; determining and utilizing voxel data to provide a volumetric measurement of each of said one or more fragments; and utilizing said volumetric measurement and density data to calculate a mass of each of said one or more fragments. The innovation disclosed herein provides ballistic gel block analysis and documentation of fragment position and mass in situ. Ballistic gel containing hundreds of fragments are positioned in a CT chamber, exposed and recorded. The fragment locations are recorded as digital volumes. Fragment mass is assessed by providing material density.

Figure 1:
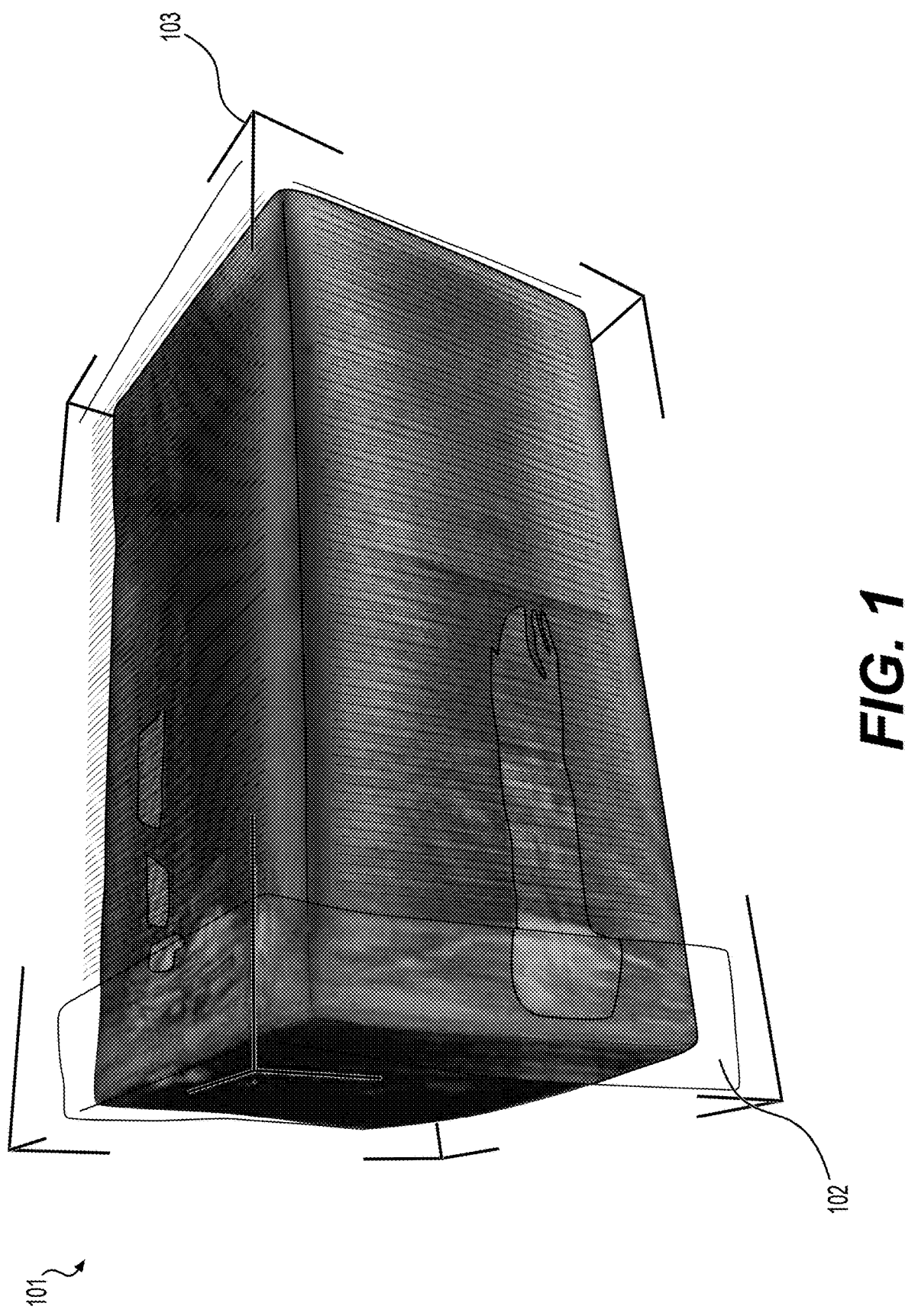
FIG. 1 shows a perspective view of a gelatin block.

FIG. 1 shows a perspective view of a gelatin block 101. The gel block analysis first starts with taking the gel block 101 and placing it inside a container 102, such as a card board box or sandwiched between two pieces of aluminum to prevent the gel block 101 from moving during scanning. The gel block 101 is placed in a Computed Tomography (CT) system and is scanned and reconstructed into a 3-D rendering. The scanning focuses on high contrast to allow the fragments to be more easily segmented during post processing.

After the scan is completed the gel block 101 is imported into volume graphics software for further analysis. Volume graphics software is commercial off-the-shelf processing software that is well understood in the art. After import, a careful surface determination is completed to outline the exact surface of the gel block 101. This determination typically involves manually manipulating the region of interest to remove surface noise and contaminates. This process creates a region of interest within the gel block 101 that highlights the outside borders 103 of the gel block 101. Once this is completed a surface is determined around the gel block 101 to create an area that can be viewed by an inclusion algorithm.

Figure 2:
FIG. 2 shows a digital rendering of the gel block with an imaging plane.

FIG. 2 shows a digital rendering of the gel block 101 with an imaging plane 201. After the surface has been determined, the next step in the process is to create an imaging plane 201 on the front of the gel block 101 where the fragmentation would have entered. Once the plane 201 has been created, the block 101 is ready to have the inclusion analysis applied to isolate potential fragmentation within the gel block 101. After a nominal surface has been completed an algorithm is executed to highlight major changes in contrast that could be fragments within the block. During this process a surface plane 201 is fitted to the face of the gel block 101 in the software. Selecting several fit points on the face of the block 101 helps eliminate non uniformity, and creates a mean surface on the face of the block 101 to measure from. As can be appreciated, depth of penetration is a key parameter often evaluated by ballistic gel. Determining the surface place provides a starting point for the depth of penetration measurement.

During the processing of the fragmentation analysis, each fragment has an edge distance determination performed from the plane 201 that was created as described above. This step allows for each fragment to be measured from the face 202 of the gel block 101, thereby providing a depth of penetration measurement. An additional analysis point is the number of voxels that makes up each fragment. A voxel is a unit of graphic information that defines a point in three-dimensional space. The voxel size is dependent on the resolution of the original scan. The voxel data can be further processed to provide a volumetric measurement in $mm^3$.

Figure 3:
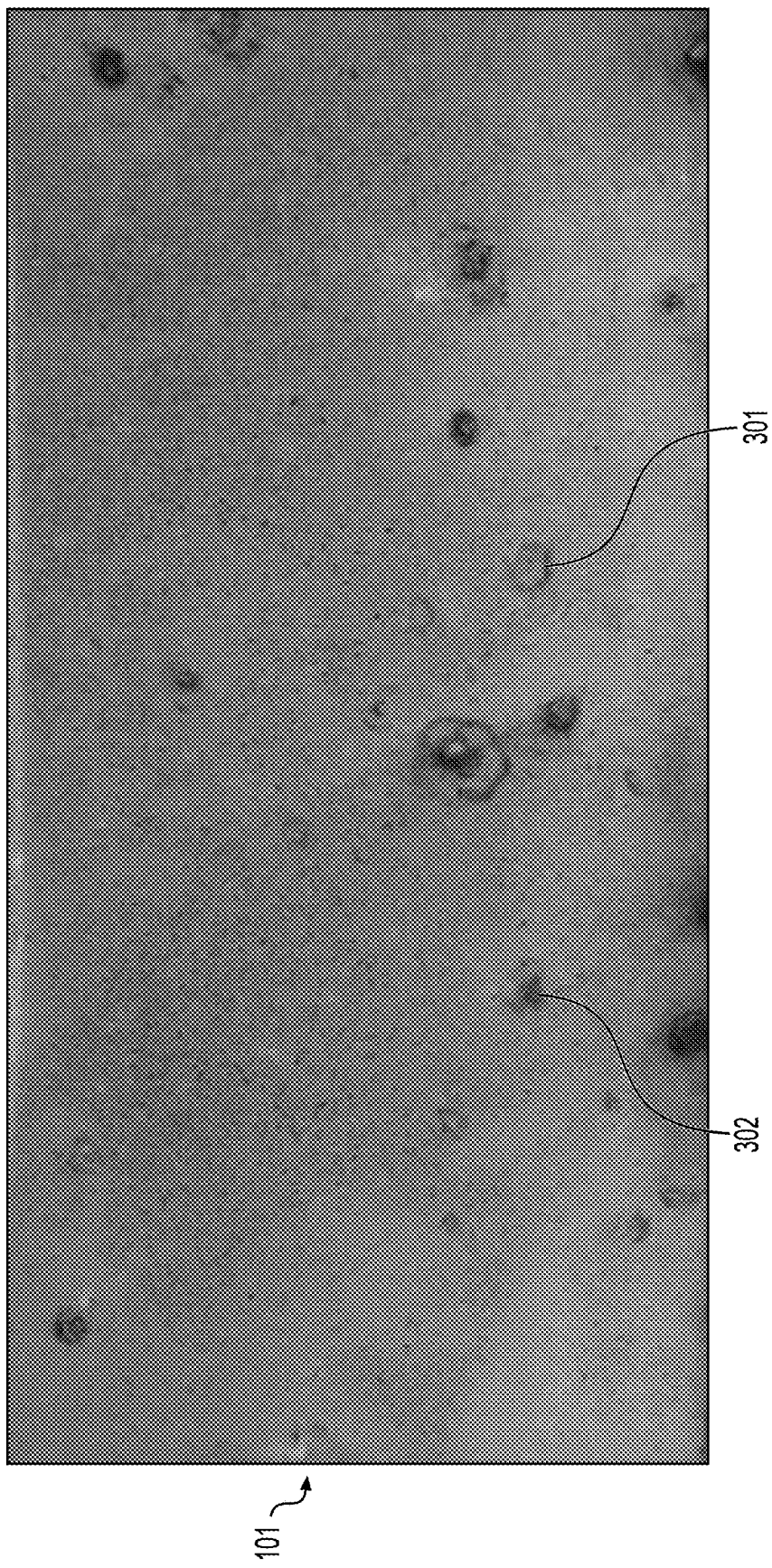
FIG. 3 shows a close-up of a gel block with fragments obscured by debris.

FIG. 3 shows a close-up of a gel block 101 with fragments 301 obscured by debris 302. One difficulty often encountered with analysis is the debris 302 contained on the block 101. As can be appreciated, the force of a blast or a projectile that is fired into the gel block 101 often cause debris 302 to adhere to the block 101, making it difficult to distinguish between fragments 301 and debris 302. Additionally, debris 302 can obscure the view into the block 101, making it nearly impossible to observe every fragment 301. As such, previous methods only provide limited information related to fragmentation, or alternatively, require many hours of careful sectioning to document fragment location and retrieval to examine mass and shape. The inventive method presently disclosed utilizes CT to identify fragments 301 by their distinct contrast differences from the surrounding gel. As part of the analysis, calculations are made as to the distance traveled inside of the block 101 along with the calculated volume of each identified fragment 301. These digital measurements are then used to calculate the mass of each fragment 301.

Figure 4:
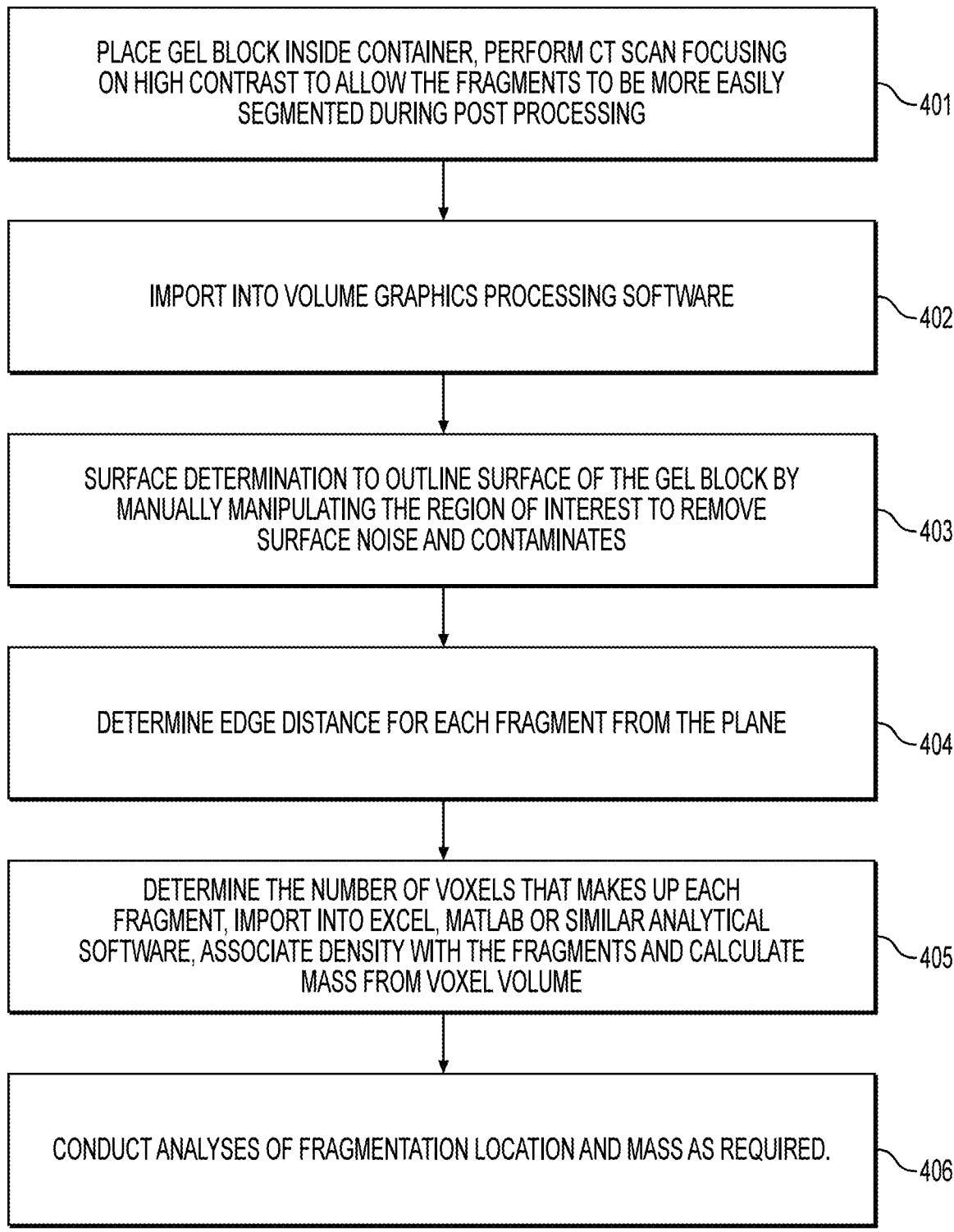
FIG. 4 shows a flow chart of the steps of the method to examine the penetration of fragments in ballistic gelatin through the use of CT equipment and analytical software.

FIG. 4 shows a flow chart of the steps of the method to examine the penetration of fragments in ballistic gelatin through the use of CT equipment and analytical software. At 401, complete a CT of the gel block focusing on high contrast to allow the fragments to be more easily segmented during post processing. To accomplish this, retrieve gel blocks from test range and transport to CT facility, insure that block orientation is tracked, insure that test event is tracked, and protect gel blocks from heat and sun. This step also removes debris of different density (often all non-steel objects) from the image. At 402, import the volume into volume graphics processing software. At 403, complete a careful surface determination to outline the exact surface of the gel block. This involves manually manipulating the region of interest to remove surface noise and contaminates. Select several fit points on the face of the block to eliminate non uniformity and create a mean surface on the face of the block to measure from. Fit a surface plane to the face of the gel block in the software. Run an algorithm to highlight major changes in contrast that could be fragments. At 404, determine the edge distance for each fragment from the plane that was created during the earlier steps. This step allows for each fragment to be measured from the face of the gel block giving a depth of penetration measurement. Determine the number of voxels that makes up each fragment. The voxel size is dependent on the resolution of the original scan, and this voxel data can then be further processed to give a volumetric measurement in $mm^3$. At 405, import the data into Excel, MATLAB or similar analytical software. Associate a density with the fragments and calculate mass from voxel volume. At 406, conduct analyses of fragmentation location and mass as required.

In summary, with the use of the inventive method, quantitative assessment of penetration and mass of hundreds of fragments within a gel block becomes practical. Debris are erased digitally. In addition, the research is more tolerable to modern organizational priorities, such as trivial item accountability, tracking, and shelf-space. Not only are the locations of the fragments known, the gel blocks do not have to be kept beyond the time to scan them. This eliminates the need to account for gel blocks in variable and various conditions. The inventive method enables essentially limitless data digital presentation and enables research requiring quantified assessment of high numbers of fragments.

Although the invention has been described in detail with reference to certain preferred embodiments, variations and modifications exist within the spirit and scope of the invention as described and defined in the following claims.

The invention claimed is:

1. A method of examining ballistic gelatin comprising:
   obtaining a ballistic gelatin block suspected of containing one or more fragments;
   performing a computer tomography scan of said ballistic gelatin block;
   using software to make a surface determination to outline the surface of said ballistic gelatin block;
   creating an imaging plane of said ballistic gelatin block where said one or more fragments would have entered;
   performing an inclusion analysis to isolate said one or more fragments within said ballistic gelatin block; and
   performing a depth of penetration measurement of each of said one or more fragments.

2. The method of claim 1, wherein said ballistic gelatin block is placed in a container prior to performing a computer tomography scan.

3. The method of claim 1, wherein scanning is high contrast CT scanning.

4. The method of claim 1, wherein said surface determination further comprises manually manipulating a region of interest to remove surface noise and contaminates.

5. The method of claim 1, wherein said software determines and utilizes voxel data to provide a volumetric measurement of each of said one or more fragments.

6. The method of claim 5, wherein said software utilizes said volumetric measurement and density data to calculate a mass of each of said one or more fragments.

7. A method of examining ballistic gelatin comprising:
   obtaining a ballistic gelatin block suspected of containing one or more fragments;
   placing said ballistic gelatin block in a container;
   performing a high contrast computer tomography scan of said ballistic gelatin block;
   utilizing volume graphics software to make a surface determination to outline the surface of said ballistic gelatin block;
   manually manipulating a region of interest to remove surface noise and contaminates;
   creating an imaging plane of said ballistic gelatin block where said one or more fragments would have entered;
   performing an inclusion analysis to isolate said one or more fragments within said ballistic gelatin block;
   executing an algorithm to highlight major changes in contrast to identify said one or more fragments within said ballistic gelatin block;
   performing a depth of penetration measurement of each of said one or more fragments;
   determining and utilizing voxel data to provide a volumetric measurement of each of said one or more fragments; and
   utilizing said volumetric measurement and density data to calculate a mass of each of said one or more fragments.

* * * * *